Figure 1:
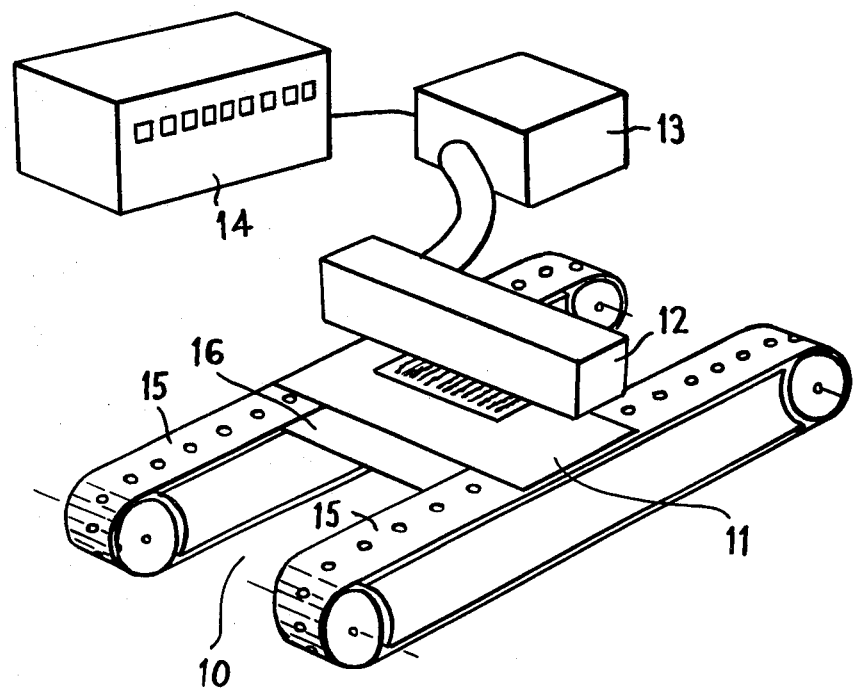

United States Patent [19]
Fuller

[11] 4,292,621
[45] Sep. 29, 1981

[54] CHARACTER READER

[76] Inventor: Paul Fuller, 29, Homeway, Harold Park, Romford, England

[21] Appl. No.: 65,658

[22] Filed: Aug. 10, 1979

[30] Foreign Application Priority Data

Aug. 14, 1978 [GB] United Kingdom ............... 33216/78

[51] Int. Cl.³ .............................................. G06K 9/28
[52] U.S. Cl. ............................ 340/146.3 H; 250/208; 358/293; 340/146.3 F
[58] Field of Search ............. 340/146.3 ED, 146.3 H, 340/146.3 F; 358/293; 250/208, 567, 568, 578

[56] References Cited
U.S. PATENT DOCUMENTS

| | | |
|---|---|---|
| 3,553,437 | 1/1971 | Boothroyd ................... 340/146.3 H |
| 3,582,884 | 6/1971 | Shepard ....................... 340/146.3 H |
| 3,710,323 | 1/1973 | Andrews et al. ............ 340/146.3 H |
| 3,811,110 | 5/1974 | Inose et al. .................. 340/146.3 H |
| 3,893,079 | 7/1975 | Shepard et al. ............. 340/146.3 F |
| 3,918,028 | 11/1975 | Humphrey et al. .......... 340/146.3 F |
| 3,925,760 | 12/1975 | Mason et al. ............. 340/146.3 ED |
| 3,962,681 | 6/1976 | Requa et al. ........................ 358/293 |
| 4,092,632 | 5/1978 | Agulnek ........................ 340/146.3 F |
| 4,203,136 | 5/1980 | Wellendorf et al. ................ 358/293 |

Primary Examiner—Leo H. Boudreau
Attorney, Agent, or Firm—Biebel, French & Nauman

[57] ABSTRACT

A system for reading characters arranged in a line on a document. The line of characters is scanned in such a manner as simultaneously to generate a plurality of parallel data signals.

9 Claims, 8 Drawing Figures

CHARACTER READER

The present invention relates to the reading of coded characters on documents. Such characters can be alphanumeric in nature or could be symbols produced for a specific purpose.

Previously lines of such characters have been read by scanning successively the characters making up the line. Obviously this has drawbacks regarding the rate at which the characters can be read and recognised.

Accordingly from a first aspect the present invention consists in a method of reading characters arranged in a line on a document by means of a scanning action caused by relative movement between a reading device and said document, which method consists in effecting said relative movement in a direction normal to the direction of said line of characters whereby all of the characters in said line are read simultaneously in order to produce data signals representative of each character, processing said data signals in parallel and producing from said processed data signals output signals representative of each character.

From a second aspect the invention consists in apparatus for reading characters arranged in a line on a document comprising a reading device, means for moving said document relative to said reading device with said line normal to the direction of said relative movement, a primary reading head in said reading device operative to scan a line of characters simultaneously to generate a plurality of groups of data signals, each group relating to an individual character of said line, means for processing said data signals in parallel to generate a plurality of matrices representative of a character, means for storing said matrices, and means for comparing said stored matrices with patterns in order to identify the characters represented by said stored matrices.

From a third aspect the invention consists in apparatus for reading characters arranged in a line on a document, comprising means for advancing a document bearing a line of characters normal to the direction of movement of the document, the reading head having an array of photosensitive detectors arranged to scan a line of characters as it passes the reading head so as to generate groups of data signals, each group being representative of a single character so that the data signals of a group represent one axis of a digitised matrix of a character, digitising means for generating a pulsed signal representative of the speed of said document passed said reading head, first memory means adapted to receive the outputs of said detectors, gating means controlled by said pulse signal and operative to write the outputs of said detectors in said first memory means at instants determined by the frequency of said pulsed signal whereby to digitise said data signals along an axis orthogonal to said one axis thereby to generate a digitised matrix for each character read which is stored in said first memory means, secound memory means storing as digitised matrices patterns of all characters read by the apparatus, and means for comparing the contents of said first memory means with said second memory means.

Figure 2:
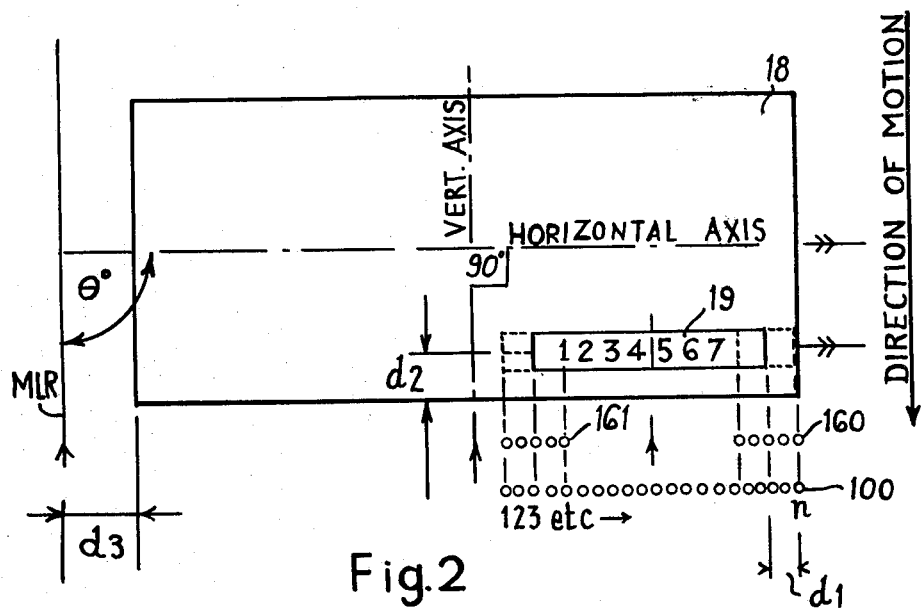
Figure 3:
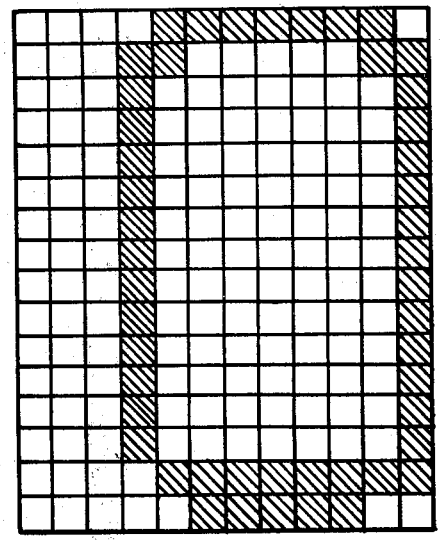
Figure 5:
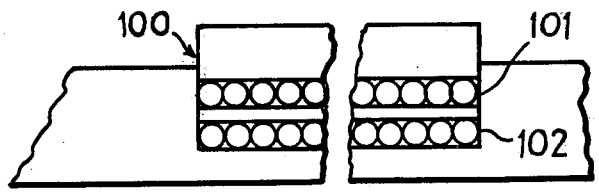
Figure 4:
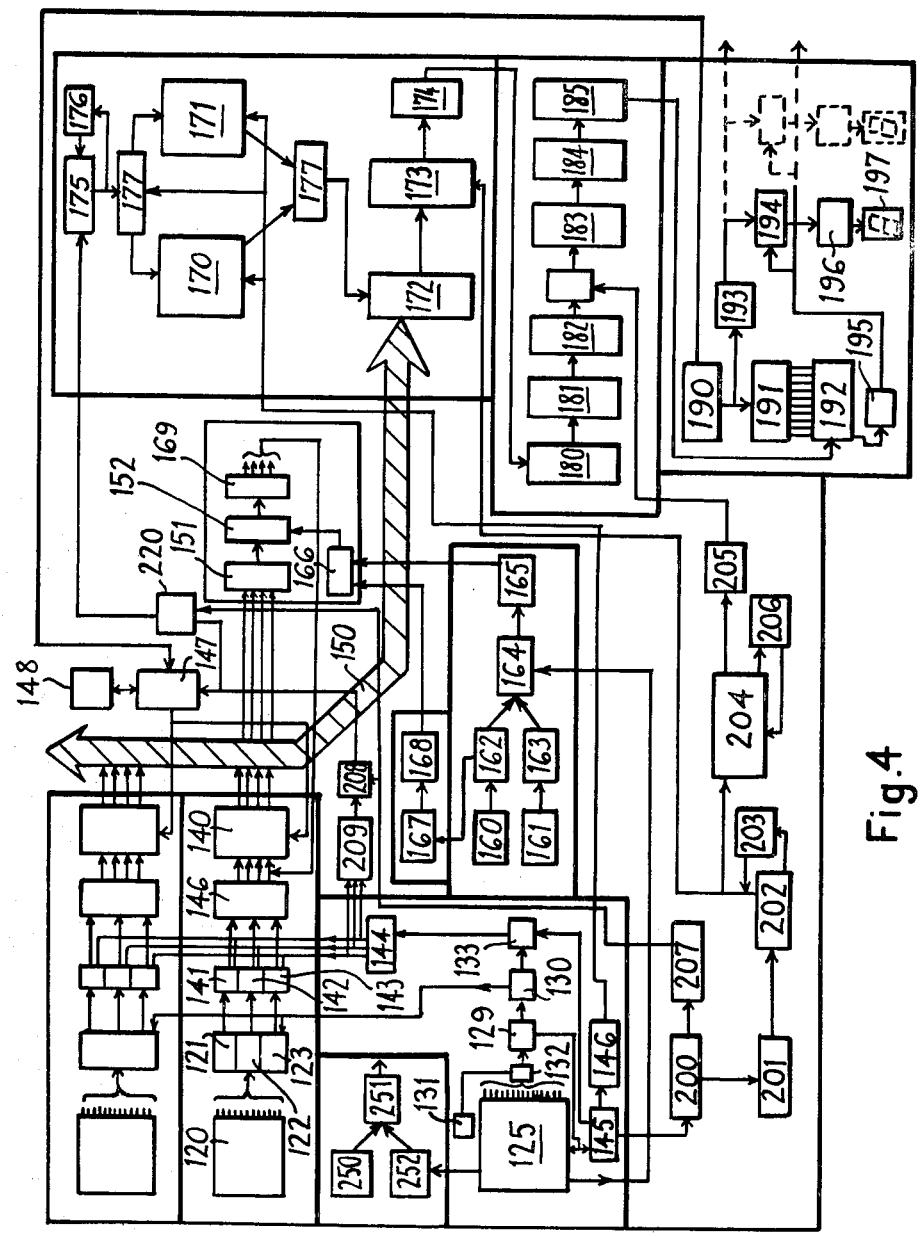
Figure 6:
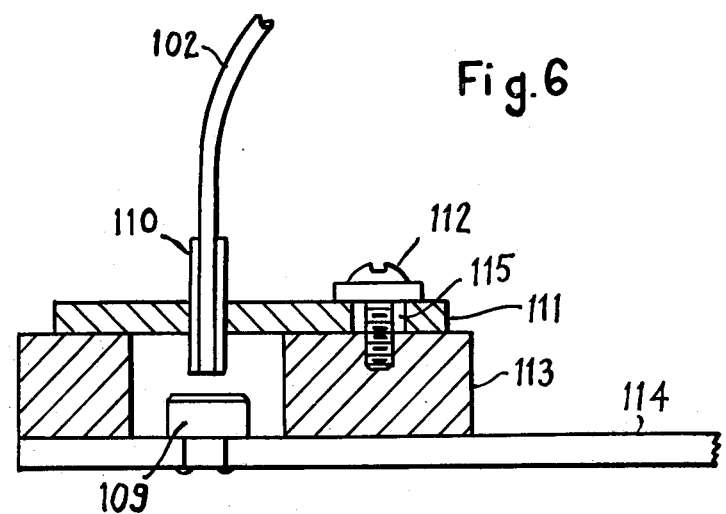
Figure 7:
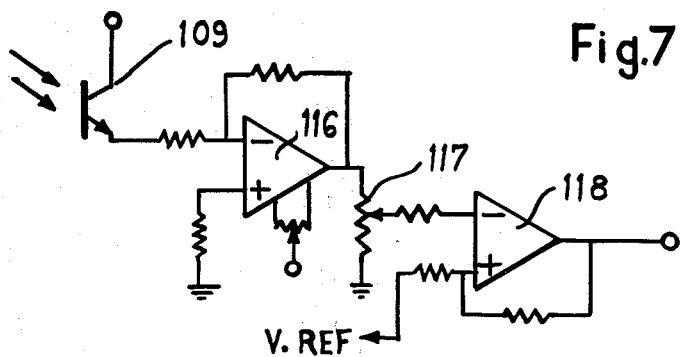
Figure 8:
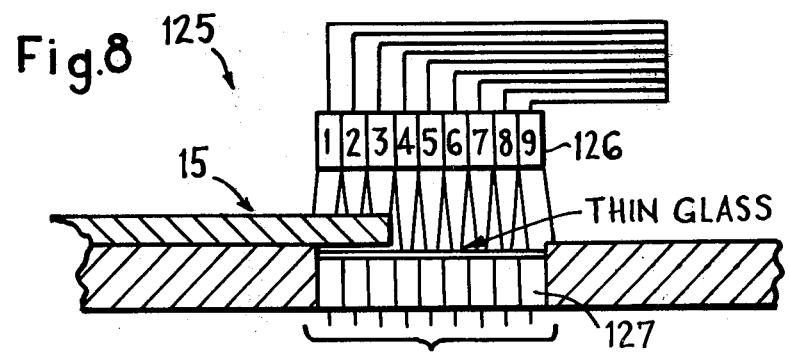

In order that the present invention may be more readily understood an embodiment thereof will now be described by way of example and with reference to the accompanying drawings, in which:

FIG. 1 is a diagrammatic side elevation of one embodiment of an optical character reading device constructed in accordance with the present invention, FIG. 2 is a plan view of a typical document to be read by the device of FIG. 1 together with a diagrammatic indication of the reading head of the device of FIG. 1, FIG. 3 shows how a digit of a code is broken down into a matrix, FIG. 4 is a block diagram of the control circuit of the device of FIG. 1, FIG. 5 is a plan view of the reading head of FIG. 1, FIG. 6 is a section through the termination of a signal fibre of the reading head, FIG. 7 is a circuit diagram of an amplifier and comparator circuit for each signal fibre, and FIG. 8 is a diagrammatic section through a device for generating pulses in proportion to the linear speed of a document being scanned.

Referring to the drawings, FIG. 1 shows optical reading apparatus comprising a conveyor 10 for advancing documents 11 bearing a code which is to be read towards an optical reading head 12. The optical reading head 12 provides output signals to a control and processor circuit 13 which in turn furnishes a data memory 14, which may include a visual display, with the data read from the code on the document.

The conveyor system 10 comprises a pair of vacuum belts 15 which hold the outer ends of the document and arranged to advance the documents 11 towards the optical reading head 12 in such a manner that a line of code on the document is scanned "long-edge first", that is all the characters of the code are scanned simultaneously and not successively. When being scanned the document paves over a plate 16 to ensure that it is flat.

FIG. 2 shows a typical document to be read by the device of FIG. 1. For the purpose of this description the document is a cheque 18 bearing a code indicated at 19 which is to be read. The code may be written in any one of a number of suitable type formats such as OCR A, OCR B or E13B.

It will be appreciated that the reading apparatus will have to compensate for a number of variations in the positioning of the code 16 on the document and of the document itself as the code passes beneath the reading head 11. These variations can be summarised as follows:

- d1 = distance of end of code from right hand edge of document
- d2 = distance of centre line of code from leading edge of document
- d3 = distance from left hand edge of document from a machine reference line MRL
- $\theta$ = angle of horizontal axis of document and code line to the line MLR. Of course in an ideal situation $\theta = 90°$.

How deviations from the ideal occurring in d1, d2, d3 and $\theta$ are compensated for will be described in detail hereinafter with specific reference to the control circuit 12.

FIG. 3 shows how a single character, in this case the digit 0, can be broken down into a matrix for recognition purposes. Thus the matrix has 12 divisions in the horizontal direction and 9 in the vertical. Each digit can accordingly be characterized by 9 twelve bit lines.

Referring now to FIG. 4 of the drawings, this shows an embodiment of the control circuit 12 for a "long-edge reader". The various sections of this circuit will now be described.

SECTION A

This section is a block diagram which includes a part of an optical reading head operative to scan a single character and to produce data signals which are stored for subsequent analysis so that the scanned character can be recognised. The main reading head itself is indicated diagrammatically in FIG. 2 and is also shown in FIG. 5 and comprises a linear array 100 of illuminator/detector elements 1, 2, 3, . . . R, the number of elements being dependent on the length of the code to be read. A single such illuminator/detector element consists of an optical fibre 101 through which light is transmitted from a light source for illumination of the code, and an optical fibre 102, hereinafter called a signal fibre, through which reflected light is transmitted from the character being scanned to a detector unit. It should be noted that the horizontal resolution of the head is determined by the diameter of the individual signal fibres and to a lesser extent the distance of the document being read from the reading head. In the present embodiment the signal and illuminator fibres have a diameter of 0.25 mm and twelve elements are intended to read each character of the document code thus providing the twelve horizontal divisions shown in FIG. 3. A complete system for reading a 10 character code together with a capability to accommodate horizontal misalignment of $\pm\frac{1}{2}$ character will require 144 individual illuminator/detector elements, and as the section A is required to handle the data generated by scanning a single character it is capable of dealing with the outputs of 12 signal fibres.

A section A' is also shown in FIG. 4 but as this section is identical to Section A it will not be described.

The illuminator fibres 101 are each coupled to a light source. For example the illuminator fibres 101 may be collected into a non-coherent bundle terminated in a brass housing which ends in a plane polished surface. The surface in turn receives light via a suitable condenser lens system from a tungsten-halogen lamp. Naturally other light sources such as light-emitting diodes, xenon flash tubes and the like may be used in accordance with system requirements.

Each signal fibre 102 is connected to its own photosensitive silicon detector 109 in a manner which is shown in FIG. 6. Each fibre 102 passes through a tubular housing 110 to which it is bonded by epoxy resin. The housing 110 in turn passes through a plate 111 screwed by a locking screw 112 to a support 113 provided on a printed circuit board 114. The aperture 115 through which the locking screw 111 passes gives a sufficient degree of play to enable the position of the fibre 102 above the photodetector 109 to be adjusted to achieve maximum sensitivity.

Associated with each photodetector 109 is an amplifier and comparator circuit shown in greater detail in FIG. 7. Each circuit comprises an amplifier 116 to one input of which the output from the detector 109 is connected. The output of the amplifier 116 is taken via a potentiometer 117 to an input of a comparator 118 to the other input of which is connected a reference voltage V.REF. The output of amplifier 116 is set by potentiometer 117 and the output of comparator 118 is a digital signal derived from the reflected light from the coded document passing under the reading head and transmitted by the signal fibre 102.

It has already been stated that Section A is arranged to handle the outputs of twelve comparators 118 each associated with an individual signal fibre 102. Thus in section A circuit block 120 represents 12 signal fibre channel and their associated amplifier and comparator circuits. The 12 output signals so generated are passed to three 4-bit latches 121, 122, 123. The fact that the signal fibres are placed side-by-side with a 0.25 mm pitch takes care of the foundation of the horizontal part of a digitised character recognition matrix. However, it is also necessary to provide the recognition matrix with a vertical formation. In order to achieve this the contents of the latches 121, 122 and 123, have to be read-out at regular intervals in accordance with the speed at which the code being read passes beneath the reading head 11. This is achieved by digitising means, called a linear digitiser, shown in block form in FIG. 3 at 125. The linear digitiser is shown in greater detail in FIG. 8.

LINEAR DIGITISER (SECTION D)

The linear digitiser 125 comprises an array of illuminator fibres 126 each of which is arranged to direct light onto an associated signal fibre 127. These fibres 126 and 127 are also laid at a pitch of 0.25 mm.

The array of fibres are placed at right angles to the leading edge of the document so that the edge of the document covers successive signal fibres 127 as the document advances. Each signal fibre has an associated amplifier and comparator circuit 128 similar to the comparator circuit described with reference to FIG. 9. As the document advances a change in d c level occurs successively at the output of each circuit 128. A pulse generator circuit 129 produces a short duration pulse for every such change of level. (Preferably two arrays of the illuminator and signal fibres are provided in overlapping relationship such that the device will generate an output pulse for every 0.125 mm movement of the document being scanned). A single pair of illuminator fibre and signal fibre is provided in advance of the fibres shown to provide an output pulse on the passing of the leading edge of the document to enable the output of the linear digitiser via a gate 132. By ensuring that the length of the main linear digitiser array is sufficiently great, all possible vertical deviations in the position of the code in the document can be catered for. Thus a train of enabling pulses is produces for every 0.125 mm movement of the document irrespective of its actual speed. The pulses from the pulse generator 129 are applied to the latches 121, 122 and 123 via a serial gate 130 so that the values stored in the latches are transferred from the latches for subsequent processing on receipt of each enabling pulse from the linear digitiser 125. It will be appreciated that just as the size of the character recognition matrix will be determined in the horizontal direction by the spacing and pitch of the signal fibres 102 in the main read head, in the vertical direction it is determined by the pitch of the signal fibres 127 in the linear digitiser.

The linear digitiser 125 also includes a read/write select circuit 145 which includes a total pulse counter. This circuit 145 counts the pulses delivered by pulse generator 129 whereby at the end of each vertical scan the cycle of the control circuit is set from write to read. The circuit 145 also controls a read/write circuit 146 the output of which controls the operation of read-only memories which will be described later.

The twelve outputs available from the latches 121, 122 and 123 are broken up into groups of 4 so as to be compatible with the structure of a 256×4 random access memory 140. This is accomplished by three scan gates 141, 142 and 143.

The scan gates 141, 142 and 143 are controlled by the output of a pulse multiplier 144.

The pulse multiplier 144 is driven during the read cycle via a gate 133 enabled by circuit 145 during the read cycle, to provide three output pulses for every pulse received from the linear digitiser 125. Thus during a read cycle the data present in scan gate 141 is enabled by a pulse from the pulse multiplier circuit 144 and entered via a level shift gate 146 into the first address of RAM 140. This address is set by RAM address register 146 during the write cycle receives pulses from pulse multiplier 144 via a parallel to serial gate 209 and a gate 208. The gate 208 serves as a routing arrangement and during the read and comparison cycle to be described later routes another pulse train to the register 146. The register 146 is provided with a reset circuit 147. Subsequently scan gate 142 is enabled and the second group of 4 bits entered on the second address of RAM 140. This scanning operation happens between successive latch enable pulses from the linear digitiser 125 and is repeated for every linear digitiser pulse until a complete picturs matrix has been built up in RAM 140. The latches 121, 122 and 123 and scan gates 141, 142 and 143 employ CMOS integrated circuits operating at 12 volts in order to enhance their overall speed. The RAM 140 is of the type MCM 145101 sold under the Registered Trade Mark "MOTOROLA" requires a 5 volts supply. It is to match these two different operating levels that the level shift gate 146 is provided.

It will be apparent that it is essential that a high speed of operation is maintained during the writing stage in which the data from a scanned character is read and digitised. Thus in the embodiment being described all re-arrangement of the data is executed after the RAM 140 has been loaded. It will be appreciated that RAM 140 is one of 12 identical RAMs which comprise the entire system and that the other 11 RAMs are loaded in parallel with RAM 140 from sections identical to Section A.

Furthermore because of the requirement for high speed, the initial storage is executed using a 4 bit structure random access memory. However, this is not a suitable device for the rearrangement of digital information and such rearrangement is necessary to compensate for position deviation of the code.

SECTION E

The data stored in RAM 140 would only be suitable for analysis to recognise the character scanned if it could have been ensured that dimensions of the code and the document on which it was printed were perfect and the document was always correctly aligned with respect to the signal fibres of the main reading head. However, as previously explained, the document itself may have been advanced past the reading head at a skew angle $\theta$ and that there may be variations in the dimensions d1, d2 and d3 which have to be compensated for before the characters of the code can be compared unambiguously with stored patterns. It is thus necessary to rearrange the data stored in RAM 140 to provide such compensation. With regard to variations of the dimension d2 it will be appreciated that the data produced by the main reading head is stored in parallel. Thus in the present embodiment variations in this dimension are automatically compensated for.

Thus once the RAM 140 has been loaded and the write cycle is complete as indicated by the circuit 145 the data stored in RAM 140 is fed via a 4-bit output data bus 150 into a parallel-to-serial converter 151 and dumped bit-by-bit into a random access memory 152 so that the data can be rearranged as described hereinafter.

LOOK AHEAD UNIT

This rearrangement is carried out under the control of checking means which in this description is called a "look-ahead unit". This unit is generally indicated at section G of FIG. 8 and which is also shown diagrammatically at FIG. 2.

As can be seen from FIG. 2 the look-ahead unit has two secondary read heads 160, 161 which are smaller than the main read head but which are mounted parallel to the main read head and a small distance in front of it with respect to the direction of travel of the document. The heads 160, 161 are symmetrically mounted respectively to the right and the left of the centre axis of the theoretical true path of the line of coded characters. Head 161 is aligned with the 2nd most significant digit (left hand of code) and with head 160 with the 2nd least significant digit (right hand of code), with each head spaning 1 digit. Thus in the present embodiment the reading heads 160 and 161 will each contain twelve illuminator/detector elements identical to those described with reference to FIG. 7. The signal fibres of these elements have amplifier and comparator circuits 162, 163 associated therewith which are identical to those described with reference to FIG. 7.

Thus when a document is passed beneath the reading heads of the look-ahead unit the outputs of the comparator circuits 162, 163 will remain at zero until the code starts to pass beneath the heads 160 and 161. In this embodiment the sensing operation of the look-ahead unit is executed from the tops of the characters being scanned, though this is not essential.

It will be appreciated that the effect of an angled document is to create an effective horizontal shift of the required information as the document travels past the main read head. It is accordingly necessary to measure this angle $\theta$. The maximum angle which can be compensated for is given by $+-\text{Tan}^{-1}$ w/L where w is the minimum gap between any two adjacent characters and L is the height of the characters. In order to determine the angle $\theta$ it would appear necessary to measure the speed of the document together with the time interval between the first data to be read by one of the heads 160 and 161 and the first data read by the other head. However as the present apparatus operates in "real time" all that is needed is a count of the number of pulses generated by the linear digitiser 125 between the first output from the first Secondary read head to be generated by the pairing code and the first output from the other Secondary read head generated by the pairing code. Furthermore the Secondary read head which first reads data will also give the control circuit the direction of skew i.e. whether $\theta > 90°$ or $\theta < 90°$.

Thus the outputs of the comparators associated with the right hand head 160 and the left head 161 are both supplied to a gating circuit 164 fed with gating pulses from the linear digitiser 125. The output of the gating circuit 164 is taken to a counter and decoder circuit 165 which gives an output to an indexing control circuit 166. The operation of the indexing control circuit 166 will be described later.

The look-ahead unit is also associated with a horizontal position section (Section H) which is operative to compensate for variations in the horizontal dimensions d1 and d3 previously mentioned.

To compensate for horizontal deviations in the code from its theoretical true path only one of the heads 160, 161 is required. In the embodiment being described this is right hand head 160.

Thus prior to the code passing the head 160 the outputs at circuit 162 are at zero. As the code moves under the head 160, every time a portion of a character passes beneath an illuminator/detector unit the output of the corresponding comparator will change appropriately. Thus the outputs of the comparators associated with head 160 are stored in a pattern generator 167. The pattern generator 167 sums the output of each comparator as the character is scanned so that after the head 160 has scanned a character the pattern generator 167 will hold a single line of twelve values representing the overall width and horizontal portion of the character scanned. Thus examination of the line of values stored in pattern generator 167 will show exactly where the 2nd least signigicant character of the code is positioned relative to the signal fibres of the main read head. This information is transferred to a position counter register 168 ready for the next read cycle, whereupon it is fed to the indexing control circuit 166 where in conjunction with the skew control information it is used to rearrange the data stored in RAM 152 to compensate for horizontal and skew deviations.

This rearrangement is carried out by reading out the original data stored in RAM 152 via a serial-to-parallel convertor 169 under the control of the index control circuit 166 and returning the rearranged data into RAM 140. The effect of the rearrangement by the index control circuit 166 is to advance or retard the data stored in RAM 140 from its original position so as to compensate both for skew angle $\theta$ and horizontal deviations of the code.

Thus as the system being described has 144 discrete illuminator-detector elements the least significant digit character would, in ideal conditions, be scanned by illuminator/detector elements 127 to 138. Elements 139 to 144 are thus available should there be variations to the right of the line of coded characters from the ideal. Thus under the control of the index circuit 166 in response to the data generated by the look-ahead circuit it is possible to ensure, for a maximum deviation to the right, that the least significant digit is scanned by elements 133 to 144 with the remaining digits being scanned by groups of 12 fibres also effectively shifted to the right. Corresponding adjustments can of course be made for smaller deviations. Naturally deviations in the opposite directions and for skew angles $\theta'' < 90$ are accommodated in a similar manner, illuminator/detector elements 1 to 6 at the left hand end of the main reading head being provided for this purpose these being excess to requirements if the code in either ideally positioned or displaced to the right.

The rearranged data stored in RAM 140 is now available for comparison with stored patterns so that the character represented by the matrix of data stored in RAM 140 can be recognised as representing a particular character.

PATTERN STORAGE AND COMPARISON

This is carried out in the circuit shown in Section J. Assuming that the characters to be recognised are digits, the patterns for the digits are stored in read only memories (ROM) 170 and 171. Digits 0–4 are stored in ROM 170 and 5 to 9 in ROM 171.

The data in the readdressed RAM 140 is fed in 4 bit bytes via the data bus 150 to a comparator 172. Simultaneously the data located at the equivalent addresses in ROM 170 are fed to the other inputs of comparator 172.

The comparator 172 acts as a latch to store the 12 bits which represent the first horizontal line of a character (see FIG. 3) and these 12 bits are compared with the first twelve bits of the same line of the digit 0. The next step is to compare the next horizontal line of 12 bits from RAM 140 with the next line of the digit $\theta$ from ROM 170. Thus the entire content of RAM 140 is compared, 12 bits at a time, with the appropriate sections of the digit $\theta$ which are stored in ROM 170. Once the contents of RAM 140 have been compared with the pattern of the digit 0 stored in ROM 170 without recognition, then the contents of RAM 140 are compared in a similar manner with the pattern of the digit 1 also stored in ROM 170. This sequence is repeated through digits 0–9 until the matrix stored in RAM 140 has been recognised. This operation is carried out sequentially for each of the RAM's corresponding to RAM 140 in the twelve channels of the apparatus.

The comparator 172 has a four bit output and a scanning gate 173 counts the bits that have been found equal during each comparison and a pulse generator 174 generates a pulse for every successful comparison of a bit. Once the entire contents of ROM 170 have been scanned, the same procedure is repeated with ROM 171, the switching between the two ROM's being controlled in a manner to be described later. The outputs of the two ROM's are selected by a ROM output select circuit 177. Naturally the two ROM's described could be replaced by a single ROM of sufficient storage capacity.

SELECTION CIRCUIT

The result of the comparison, in the form of the pulses generated by pulse generator 174 are fed to section K and are counted in a counter 180. A 4–16 line converter 181 gives a 16 step output the level of which depends on the number of accurate comparisons made in any complete line line (i.e. 12 bits) if the number of accurate comparisons is above a pre-set percentage which is set by a reject/accept circuit 181 a count pulse is transferred to a line total counter 182 as an acceptable line. This process is then repeated for the line count, that is a 4–16 converter 184 gives a 12 step output level depending on the number of acceptable lines. This output is supplied to a reject/accept circuit 185 and if the number of acceptable lines is above a present value the number is known and circuit 185 gives an output pulse.

CHARACTER SELECTION AND DISPLAY

The output pulse from reject/accept circuit 185 is supplied to a "CHARACTER SELECTION AND DISPLAY" circuit (section M). The circuit monitors exactly which character, in the present embodiment a digit, is currently being compared by comparator 172. The counting is carried out by a binary counter 190 driven by a timing circuit (section M) which will be described later in sign division with the RAM addresser register 147. The binary count in counter 190 is converted by a 4–16 line decoder 191 (only 4–10 is essential for digit recognition) and the outputs of decoder 191 are taken to a gate circuit 192 which is enabled on receipt of a pulse from the reject/accept circuit 185 indicating a recognised number. The gate circuit 192 generates the correct information for passing to the appropriate channel. There will of course be a channel for every character in the code being scanned so that in the present embodiment there are 10 channels. The channels are selected by a channel select circuit 193 which is also fed with the output of the binary counter 190.

When a complete character has been recognised, the enabling signal at gate circuit 192 causes the information to be latched in a 4 bit latch 194 in the channel selected by the channel select circuit 193, and displayed on receipt of a strobe signal from a one shot strobe circuit 195. On receipt of the strobe the latch 194 provides an output to a 7-segment decoder circuit 196 for display by a suitable optical display unit 197.

TIMING SECTION

The timing for the control circuit during the reading and comparison of data stored in RAM 140, and the equivalent RAM's in the other channels is generated by the TIMING SECTION (SECTION L) which has as its main control element a main oscillator 200 which is started on receipt of a pulse from the read/write select circuit 145. This oscillator 200 is followed by a 4x pulse multiplier 201. The output of multiplier 201 is fed to a comparator scan counter 202 the output of which provides the enabling signals for the comparator scanning gate 173. The comparator scan counter 202 includes a reset circuit 203 which resets the counter 202 at the end of each comparison cycle.

The output of comparator scan counter 202 is also taken to a line count circuit 204 which provides an output pulse at each line to a 1-shot strobe circuit 205 the output of which enables the transfer circuit 182 to transfer an acceptable line from the reject/accept circuit 181 to the line total counter 183. The line count circuit 204 also has its own reset circuit 206.

The output of the main oscillator 200 is also taken to a start/inhibit circuit 207 which supplies pulses to the gate 208 only during the read and compare cycle. During the read and compare cycle the gate 208 gates pulses from the main oscillator 200 to the address register 147 rather than the pulses from gate 209

The output of gate 208 during the read and comparison cycle is also taken to the ROM address registed 175 via a gate 220 to ensure synchronism when the data stored in RAM 140 is compared with the contents of ROMs 170, 171. The gate 220 is only enabled during the read and comparison cycle as determined by start/inhibit circuit 207. The ROM address register 175 has a reset circuit 176 and controls via a ROM input select 177 which of the ROM's 170, 171 is used during the comparison cycle.

SECTION C

This section is used at switch on and includes a circuit 250 which provides on switch-on a pulse which automatically clears all registers, flip-flop and latches via a gate 251.

Upon receipt of a final pulse from the linear digitiser 125 a circuit 252 also gives a pulse through gate 151 to reset the various circuits as previously described for the next cycle. This pulse is delayed by an amount sufficient to ensure adequate reading and comparison time.

It will be appreciated that a number of modifications are possible to the apparatus described herein.

For example, instead of using the linear digitiser 125 to provide enabling pulses to gate data into the RAM's, an alternative solution would be to pulse the light source to the illuminator fibres 101 of the main reading head at a frequency dependent on the speed of the document relative to the reading head so as to digitise the inputs to the signal fibres 102 before the outputs of the associated photodiodes 109 are amplified and compared.

It is also possible that the comparison between the matrices read into the RAM's such as RAM 140 and the patterns stored in the ROM's could also be carried out in parallel. This would require duplication of sections J and K for every character channel.

It will also be appreciated that the apparatus described can be used in conjunction with similar apparatus for a variety of different purposes. Thus the reading apparatus described could be used to check numbers and groups of documents so that their groups can be collated with documents checked by a second reading machine operating in parallel.

I claim:

1. A method of reading characters arranged in a line on a document by means of a scanning action caused by relative movement between a reading device and said document, said method comprising the steps of:
   (a) effecting said relative movement in a direction normal to the direction of said line of characters whereby all of the characters in said line are read simultaneously by said reading device;
   (b) generating simultaneously a plurality of parallel data signals in respect of each character read by said reading device so as to provide digitisation of each said character along a first axis transverse to the direction of the line of characters and thereby to form parts of matrices each of which is representative of a character;
   (c) generating a pulsed signal the frequency of which is dependent on the speed of said document relative to said reading device;
   (d) utilizing said pulsed signal to sample said plurality of parallel data signals so as to provide digitization of each character along a second axis orthogonal to said first axis and thereby complete said character matrices;
   (e) storing said digitized matrix signals in a first memory means; and
   (f) comparing said stored matrix signals with stored patterns in second storage means thereby to recognize the characters read by said reading device.

2. The method of claim 1, including:
   (a) detecting the orientation of said line of characters relative to said direction of relative movement between said line of characters and said reading device; and
   (b) rearranging the stored matrix signals prior to said comparison step to compensate for any detected deviation in the orientation of said line.

3. The method of claim 2, including the steps of:
   (a) detecting the orientation of said line by means of a pair of secondary reading heads located ahead of said reading device in the sense of the relative movement between said document and said reading device;
   (b) transferring the stored matrix data into a third memory means; and
   (c) returning the stored data from said third memory means to said first memory means, the data being advanced or retarded in accordance with the signals from said secondary heads to compensate for any detected deviation.

4. The method of claim 3, including the step of utilising one of said secondary reading heads to determine deviations of said line in a direction normal to said direction of relative movement between said reading device and said document.

5. Apparatus for reading documents arranged in a line on a document comprising:
   (a) a reading device;
   (b) means for moving said document relative to said reading device with said line normal to the direction of said relative movement;
   (c) a primary reading head in said reading device operative to scan a line of characters simultaneously to generate a plurality of groups of parallel data signals, each group relating to an individual character of said line and providing digitisation of each said character along a first axis transverse to the direction of the line of characters and thereby to form parts of matrices each of which is representative of a character;
   (d) means for generating a pulsed signal the frequency of which is dependent on the speed of said document relative to said reading device;
   (e) sampling means operative to utilise said pulsed signal to sample said plurality of parallel data signals so as to provide digitisation of each character along a second axis orthogonal to said first axis and thereby complete said matrices;
   (f) means for feeding said matrices in parallel into first memory means; and
   (g) means for comparing said matrices in said first memory means with patterns stored in second memory means thereby to recognise said stored matrices as representing characters.

6. The apparatus of claim 5, and further including:
   (a) means operative to scan said document as it is advanced towards said primary reading head to generate said pulsed signal, and
   (b) gating means responsive to said pulsed signal to gate said parallel, digitised into said first memory means.

7. Apparatus for reading characters arranged in a line on a document comprising:
   (a) a reading device;
   (b) means for moving document relative to said reading device with said line normal to the direction of said relative movement;
   (c) a primary reading head in said reading device operative to scan a line of characters simultaneously to generate a plurality of groups of parallel data signals, each group relating to an individual character of said line, said reading head including:
      (1) a plurality of optical fibres arranged in a linear array transverse to said direction of movement,
      (2) an individual photosensitive detector associated with each optical fibre, each photosensitive detector having an associated amplifier circuit so as to generate an output signal in accordance with whether the portion of a character or a blank part of said document is passing relative to the optical fibre associated therewith, said linear array thus generating a plurality of parallel data signals and providing digitisation of each said character along a first axis transverse to said direction of the line of characters and thereby forming parts of matrices each of which is representative of a character;
   (d) means operative to scan said document to generate a pulsed signal the frequency of which is proportional to the rate of relative movement of said document relative to said primary reading head;
   (e) gating means responsive to said pulsed signal and operate to gate said plurality of parallel data signals generated by said primary reading head;
   (f) first memory means associated with said gate means and operative to store said gated and digitised plurality of data signals as a plurality of matrices each representative of a character scanned by said reading head;
   (g) second memory means storing a plurality of patterns in matrix form;
   (h) comparator means for comparing the contents of said first memory means with the contents of said second memory means thereby to recognise the characters forming said matrices; and
   (i) character selection means operative to indicate recognition of a character matrix.

8. The apparatus of claim 7, wherein the means for generating the pulsed signal comprise at least one linear array of photodetecting devices arranged parallel to the direction of relative movement between said document and said reading head.

9. Apparatus for reading characters arranged in a line on a document comprising:
   (a) a reading device;
   (b) means for moving said document relative to said reading device with said line normal to the direction of said relative movement;
   (c) photosensitive scanning means arranged in an array transverse to said direction of movement and spanning a length greater than the expected length of said line, said photosensitive scanning means being operative to generate simultaneously a plurality of groups of parallel data signals, each group representing a character to be recognised;
   (d) a linear array of photosensitive devices arranged parallel to said direction of movement and operative to generate a pulsed signal the frequency of which is directly proportional to the relative rate of movement between said document and said reading device;
   (e) gating means controlled by said pulsed signal and operative to digitise said parallel data signals at the frequency of said pulsed signal;
   (f) first memory means operative to store in parallel said digitised data signals;
   (g) a secondary reading head arranged in advance of said primary reading head and operative to scan the end of said line of characters to detect deviations in the position of said line from an ideal position and to generate an output signal in respect of such deviation;
   (h) second memory means storing patterns of characters;
   (i) third memory means;
   (j) means for transferring the data stored in said first memory means into said third memory means;
   (k) index control means responsive to the output signal from said secondary reading head and operative to transfer the contents of said third memory means into said first memory means in such a manner as to shift the locations of the matrix data stored in said first storage means to compensate for deviations detected by said secondary reading head; and
   (l) comparator means for comparing the matrix data stored in said first memory means after it has been transferred from said third memory means with the patterns stored in said second memory means.

* * * * *